(12) United States Patent
Di Palma et al.

(10) Patent No.: US 7,761,742 B2
(45) Date of Patent: *Jul. 20, 2010

(54) MONITORING SYSTEM WITH TRUSTED CORRECTIVE ACTIONS

(75) Inventors: Andrea Di Palma, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/264,979

(22) Filed: Nov. 5, 2008

(65) Prior Publication Data

US 2009/0077419 A1    Mar. 19, 2009

Related U.S. Application Data

(63) Continuation of application No. 11/221,605, filed on Sep. 8, 2005, now Pat. No. 7,464,294.

(30) Foreign Application Priority Data

Sep. 20, 2004  (EP)  .................................. 04104547

(51) Int. Cl.
*G06F 11/00* (2006.01)

(52) U.S. Cl. .......................................... 714/21; 714/15

(58) Field of Classification Search ..................... 714/21
See application file for complete search history.

(56) References Cited

U.S. PATENT DOCUMENTS

| 7,089,450 B2 | 8/2006 | Anderson et al. |
| 7,130,770 B2 | 10/2006 | Di Palma et al. |
| 7,286,962 B2 | 10/2007 | Di Palma et al. |
| 2005/0015665 A1 | 1/2005 | Kato et al. |

OTHER PUBLICATIONS

U.S. Appl. No. 11/221,605, Image File Wrapper printed from PAIR on Feb. 3, 2010, 2 pages.

*Primary Examiner*—Christopher S McCarthy
(74) *Attorney, Agent, or Firm*—Francis Lammes; Stephen J. Walder, Jr.; Jill A. Poimboeuf

(57) ABSTRACT

A system and computer program product for monitoring a data processing system is proposed. The system and computer program product involve the measuring of state parameters of the system. Indicators of the performance of the system are then inferred from the state parameters by applying fuzzy-logic rules. The proposed solution is based on the idea of estimating a trust value, based on the effectiveness of the corrective actions. If the previous corrective actions prove to be effective than the trust value is enhanced and the system is allowed a higher level of autonomy. Otherwise the intervention of an operator might be invoked.

22 Claims, 5 Drawing Sheets

MONITORING SYSTEM WITH TRUSTED CORRECTIVE ACTIONS

This application is a continuation of application Ser. No. 11/221,605, filed Sep. 8, 2005, status awaiting publication.

TECHNICAL FIELD

The present invention relates to the data processing field. More specifically, the present invention relates to a method of monitoring a data processing system. The invention further relates to a computer program for performing the method, and to a product embodying the program. Moreover, the invention also relates to a corresponding data processing system.

BACKGROUND ART

Applications for monitoring data processing systems play a key role in their management. For example, those applications are used to detect any critical condition in the system (so that appropriate corrective actions can be taken in an attempt to remedy the situation). Typically, the essential information relating to the critical conditions being detected is logged; the information is then available for off-line analysis through data warehousing techniques.

For this purpose, selected performance parameters of the system (such as a processing power consumption, a memory space usage, a bandwidth occupation, and the like) are measured periodically. The information so obtained is then interpreted (for example, according to a decision tree) so as to identify any critical condition of the system. For example, the occurrence of a low response time of the system can be inferred when both the processing power consumption and the memory space usage exceed corresponding threshold values. The monitoring applications known in the art are configured with predefined corrective actions, which are launched in response to the detection of corresponding critical conditions.

A drawback of the solution described above is that sometimes system administrators might be afraid to concretely use the actions offered by the monitoring engine. They prefer just to be notified of a problem and then to decide what to do to correct it manually. This is due to a lack of trust in the control action done by the monitoring system. To mitigate this feeling and this lack of trust, a validation mechanism would be helpful.

A possible solution could be that of conditioning the execution of a corrective action to the approval of the system administrator. Of course this solution would heavily compromise the autonomy of the monitoring system and also its efficiency. On the other hand a rigid threshold based decision mechanism could be not well tuned on the needs and the peculiarities of the monitored system.

SUMMARY OF THE INVENTION

In one illustrative embodiment, a method is provided for monitoring a data processing system. The illustrative embodiment provides at least one performance indicator of the system. The illustrative embodiment detects a critical condition of the system according to the at least one performance indicator. The illustrative embodiment selects a corrective action for the critical condition, the corrective action having a corresponding action effectiveness parameter. The illustrative embodiment authorises the execution of the corrective action if the corresponding action effectiveness parameter satisfies predetermined threshold criteria. The illustrative embodiment verifies the effectiveness of the execution of the corrective action on the critical condition. The illustrative embodiment updates the corresponding action effectiveness parameter according to the effectiveness of the corrective action. In the illustrative embodiment, the critical condition is defined by a severity indicator. In verifying the effectiveness of the execution of the corrective action on the critical condition, for each at least one performance indicator, the illustrative embodiment logs a plurality of detected severity indicators. The illustrative embodiment estimates the action effectiveness with a function depending on a set of the plurality of detected severity indicators. In estimating the action effectiveness with a function depending on a set of the plurality of detected severity indicators, the illustrative embodiment using the function $AE=\frac{1}{2}[I(t_1)-I(t_2)+1]$, where AE is the action effectiveness and $I(t_n)$ is the severity indicator at time n.

In another illustrative embodiment, a method is provided for monitoring a data processing system. The illustrative embodiment provides at least one performance indicator of the system. The illustrative embodiment detects a critical condition of the system according to the at least one performance indicator. The illustrative embodiment selects a corrective action for the critical condition, the corrective action having a corresponding action effectiveness parameter. The illustrative embodiment authorises the execution of the corrective action if the corresponding action effectiveness parameter satisfies predetermined threshold criteria. The illustrative embodiment verifies the effectiveness of the execution of the corrective action on the critical condition. The illustrative embodiment updates the corresponding action effectiveness parameter according to the effectiveness of the corrective action. In provides the at least one performance indicator, the illustrative embodiment measures at least one state parameter of the system. The illustrative embodiment converts each state parameter into a corresponding input fuzzy variable. The illustrative embodiment applies at least one fuzzy-logic rule defining at least one output fuzzy variable as a function of the at least one input fuzzy variable, each output fuzzy variable being associated with a corresponding performance indicator. The illustrative embodiment converts each output fuzzy variable into the corresponding performance indicator.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to

DETAILED DESCRIPTION OF THE PREFERRED EMBODIMENT(S)

Figure 1:
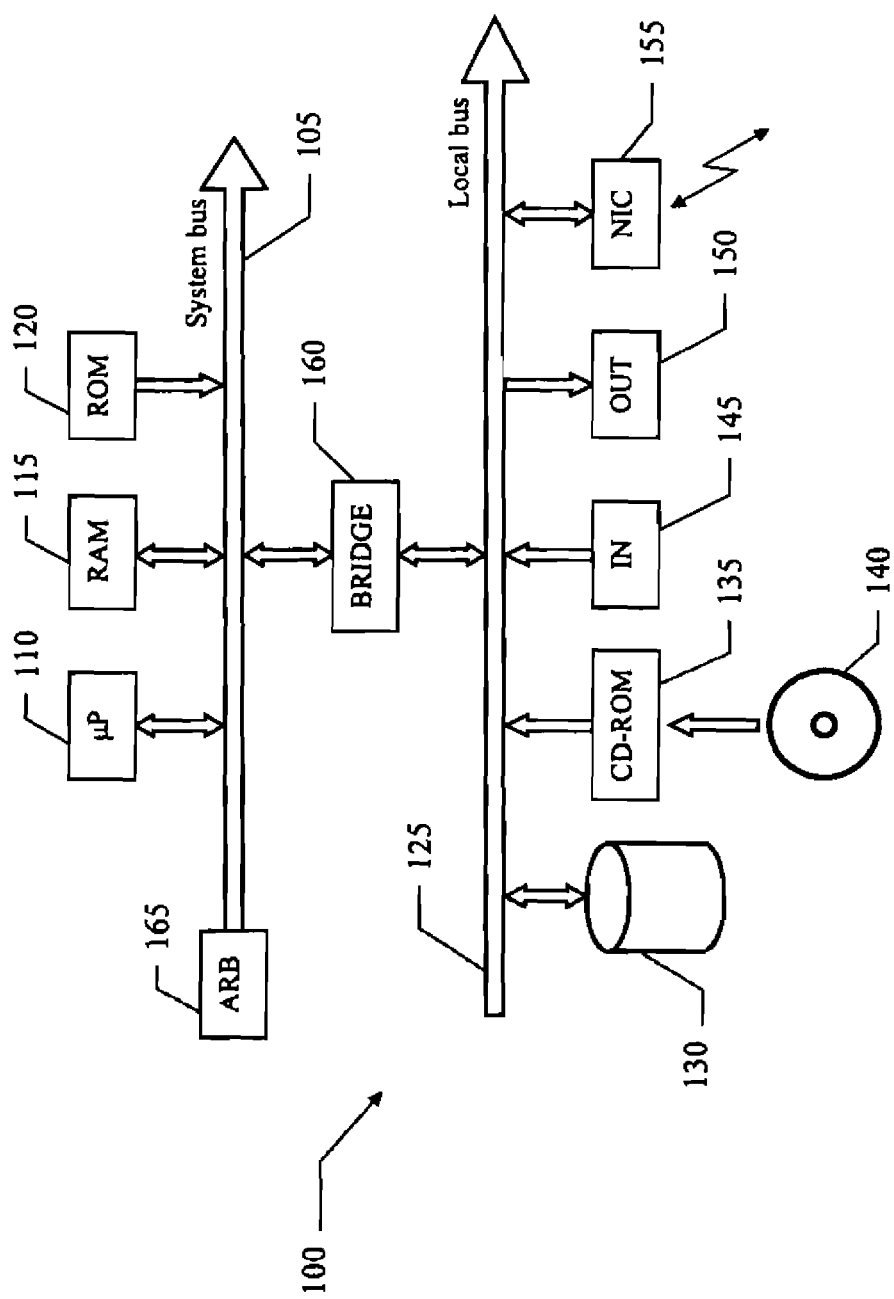
FIG. 1 is a schematic block diagram of a data processing system in which the method of the invention is applicable.

With reference in particular to FIG. 1, a system 100 that can be used for implementing the method of the invention is illustrated. The system 100 consists of a computer, which is formed by several units connected in parallel to a system bus 105. In detail, one or more microprocessors (µP) 110 control operation of the computer 100; a RAM 115 is directly used as a working memory by the microprocessors 110, and a ROM 120 stores basic code for a bootstrap of the computer 100. Peripheral units are clustered around a local bus 125 (by means of respective interfaces). Particularly, a mass memory consists of a hard-disk 130 and a drive 135 for reading CD-ROMs 140. Moreover, the computer 100 includes input devices 145 (for example, a keyboard and a mouse), and output devices 150 (for example, a monitor and a printer). A Network Interface Card (NIC) 155 is used to connect the computer 150 to the network. A bridge unit 160 interfaces the system bus 105 with the local bus 125. Each microprocessor 110 and the bridge unit 160 can operate as master agents requesting an access to the system bus 105 for transmitting information. An arbiter 165 manages the granting of the access with mutual exclusion to the system bus 105.

Typically, the solution of the invention is used to monitor multiple endpoints in a data processing system with distributed architecture (each endpoint consisting of the above-described computer 100). In this case, the same monitoring application is deployed to each endpoint so as to control its operation directly; the results of the monitoring are usually collected by a central server periodically (for example, every night).

Similar considerations apply if the computer has a different structure, includes equivalent units, or consists of other data processing entities (such as PDAs, mobile phones, and the like). Moreover, the solution of the invention is also suitable to be used in a system wherein the endpoints are controlled centrally by the server; in any case, the application of the proposed solution in a stand-alone computer is not excluded.

Figure 2A:
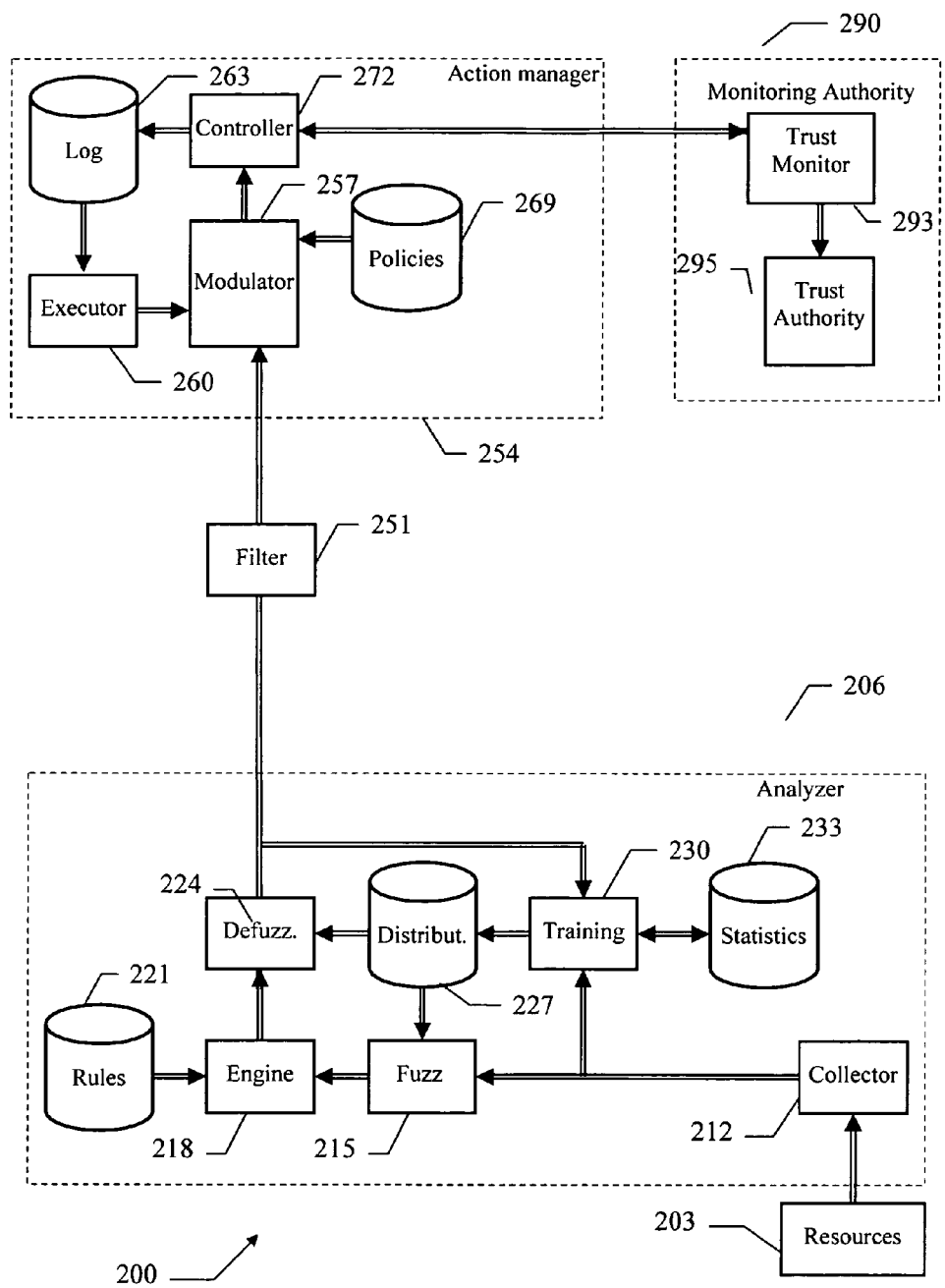
FIG. 2a depicts the main software components that can be used for practicing the method.

Considering now FIG. 2a, the main software components that can be used to practice the method of the invention are illustrated. The information (programs and data) is typically stored on the hard-disk and loaded (at least partially) into the working memory when the programs are running. The programs are initially installed onto the hard-disk from CD-ROMs.

Particularly, an agent 200 is used to monitor relevant hardware and/or software resources 203 of the above-described system. For this purpose, the monitoring agent 200 includes an analyzer 206, which periodically measures state parameters of the system, according to predefined resource models. Each resource model identifies the key state parameters that define correlated resources 203 in a specific context; for example, the resource model involves the measuring of a processing power consumption, a memory space usage, a bandwidth occupation, and a number of concurrent users for controlling the response time of a web application.

More in detail, the state parameters are gathered by a collector 212. The state parameters are then supplied to a module 215, which converts them into fuzzy logic variables. Fuzzy logic is an approach to computing based on degrees of truth, or confidences (rather than the usual true and false values of the Boolean logic). For this purpose, each fuzzy variable is associated with a set of linguistic properties (typically in an odd number), which properties define qualitative levels of the fuzzy variable (such as very low, low, normal, high and very high). Each property is defined by the confidence that the fuzzy variable has this property; the confidences (ranging from 0 for false to 1 for true) are very similar to probabilities, except that they do not need to sum to one. For example, in the above-mentioned case the fuzzy variable can be 0.05 very low, 0.12 low, 0.65 normal, 0.35 high, and 0.22 very high. The confidences (of generic fuzzy variables x and y) can be combined with standard operators, such as:

$$\text{NOT}(x) = 1 - x$$

$$x \text{ AND } Y = \text{Minimum}(x, y)$$

$$x \text{ OR } Y = \text{Maximum}(x, y)$$

Figure 2B:
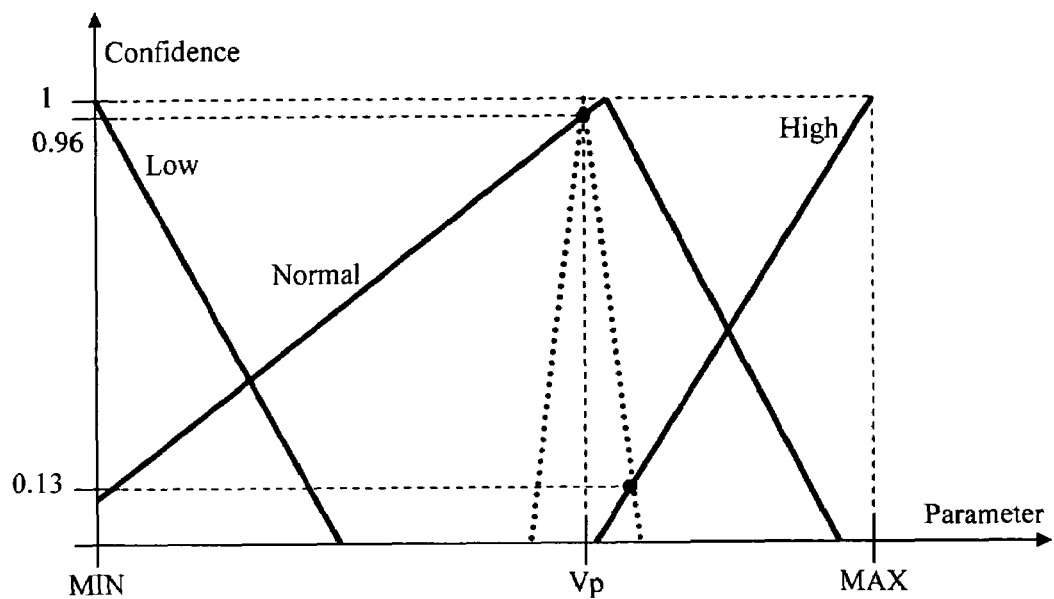
FIGS. 2b-2c illustrate examples of conversion from a state parameter to an input fuzzy variable and from an output fuzzy variable to a performance indicator, respectively.

In the specific application of the monitoring agent 200, each state parameter is preferably associated with a fuzzy variable having three properties (low, normal and high). As shown in FIG. 2b, the distributions of the confidences of those properties are typically defined by triangles; the triangles span a so-called universe of discourse, which defines the range of admitted values for the state parameter (from a minimum value MIN to a maximum value MAX). The confidences of the properties are obtained from the value of the state parameter. For this purpose, a comparison triangle (having a height equal to 1 and a predefined amplitude, for example, 5-15% of the universe of discourse) is centered on the value of the state parameter. The confidence of each property consists of the highest ordinate of the points of intersection between the triangle of the corresponding distribution and the comparison triangle (with the confidence that is set to 0 when no point of intersection is available). In the example at issue, a value Vp of the state parameter provides a corresponding fuzzy variable that is 0.0 Low, 0.96 Normal and 0.13 High.

Returning to FIG. 2a, the fuzzy variables determined by the module 215 (hereinafter called "fuzzifier") are supplied to an engine 218. The engine 218 accesses a repository 221 of inference rules. Each inference rule 221 propagates the confidences of conditions defined by input fuzzy variables to a conclusion defined by an output fuzzy variable; in the example at issue, the input fuzzy variables represent the state parameters, while the output fuzzy variables represent indicators of the performance of the computer (for example, relating to its workload). More in detail, the inference rules 221 are basically if-then relations; each relation defines an expression based on the properties of input fuzzy variables, which evaluation provides the confidence of a property of an output fuzzy variable. For example, denoting with Pb and Pu the input fuzzy variables associated with the bandwidth occupation and the concurrent users, respectively, and with Iw the output fuzzy variable associated with the workload, it is possible to define the following inference rule:

IF (Pb is High OR Pu is High) THEN Iw is High (meaning that the workload of the computer is high when either the bandwidth occupation or the concurrent users are high). Assuming that Pb is 0.22 High and Pu is 0.75 High, we have that Iw is High with a confidence equal to Maximum (0.22, 0.75)=0.75.

Figure 2C:
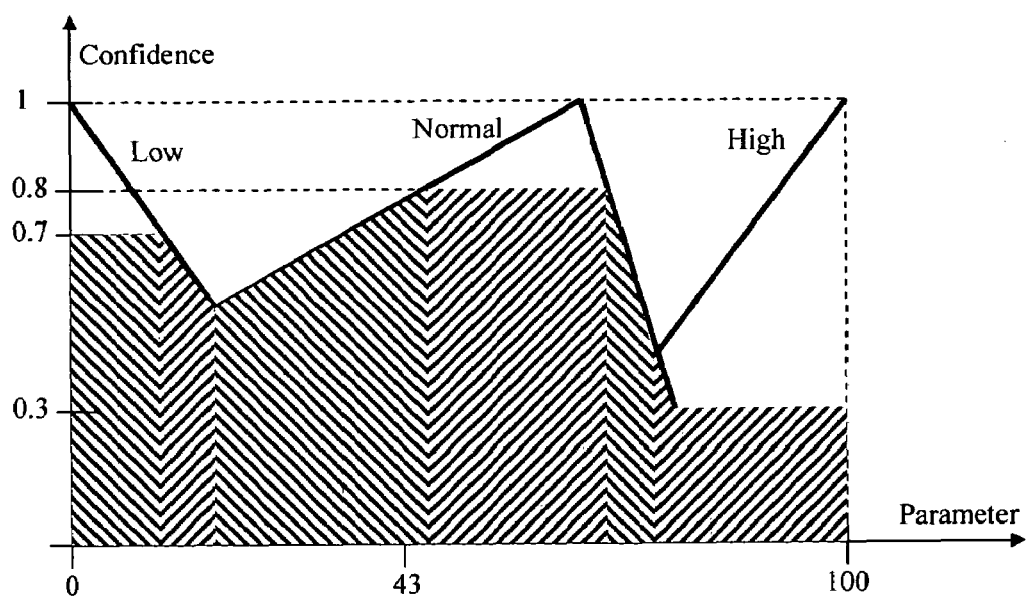

The output fuzzy variables so obtained are supplied by the engine 218 to a module 224 (hereinafter called "defuzzifier"), which converts them into the corresponding (crisp) performance indicators; typically, the performance indicators are normalized to range from a minimum value (for example, 0) to a maximum value (for example, 1). As shown in FIG. 2c, this process is preferably carried out using the center of gravity algorithm. Particularly, each distribution is clipped according to the corresponding confidence (so as to define a trapezoid in the example at issue). The abscissa of the center of gravity of the total area so obtained is then calculated. For this purpose, the area is partitioned into basic blocks at each (relative) minimum/maximum; denoting with $A_k$ the extension of each k-th basic block and with $M_k$ the corresponding arm (i.e., the distance of the central point in its base from the origin), the position of the center of gravity Cg is given by the formula:

$$Cg = \frac{\sum A_k \cdot M_k}{\sum A_k}$$

This choice strongly reduces the computation complexity, at the same time maintaining an acceptable degree of approximation. For example, let us suppose that the output fuzzy variable is 0.7 Low, 0.8 Normal and 0.3 High; the application of the above-mentioned algorithm to the distributions shown in the figure provides a performance indicator equal to 0.43.

Returning to FIG. 2a, the distributions of the input and output fuzzy variables are stored into a repository 227, which is accessed by both the fuzzifier 215 and the defuzzifier 224. The distributions of the (input/output) fuzzy variables are dynamically updated by a training module 230. For this purpose, the training module 230 gathers the state parameters from the collector 212 and the performance indicators from the defuzzifier 224; those values are stored into a table 233, together with corresponding running statistics (such as the mean value and the normalized variance).

The current values of the performance indicators so obtained are provided to a filter 251 which determines whether a corrective action is needed or not. In a preferred embodiment the system also include a predictor module (not shown on the Figures), which estimates the expected values in the future of the performance indicators. More in detail, for each performance indicator (generically denoted with I) a set of samples of its current values (taken at s successive measuring cycles preceding the current one, such as 10-20) are buffered into a corresponding queue. The samples stored in the queue are input to a corresponding Linear Predictive Filter (LPF), which estimates the expected performance indicator (denoted with $\hat{I}$) from a linear combination of its samples. The linear combination is typically implemented as a weighted sum of the samples. Denoting with n the current cycle, the expected performance indicator at the next cycle $\hat{I}(n+1)$ will be:

$$\hat{I}(n+1) = \Sigma_{i=0 \ldots s-1} w(i) \cdot I(n-i)$$

wherein $w(0), w(1) \ldots w(s-1)$ are the weights associated with the samples $I(n), I(n-1) \ldots I(n-s+1)$, respectively. Likewise, the expected performance indicator at a still next cycle $\hat{I}(n+2)$ is estimated according to an updated set of samples, obtained by adding the expected performance indicator $\hat{I}(n+1)$ and discarding the oldest one. The same operation can be reiterated, so as to estimate the expected performance indicator $\hat{I}(n+p)$, p cycles ahead from the current one. Of course, the extension of the prediction reduces its accuracy since the expected performance indicator is based more and more on values that are themselves estimated (instead of being true samples); a good compromise between the opposed requirements of a long prediction and a high accuracy can be achieved by setting the parameter p to a value in the range from 1 to 15 (for example, 8).

The weights w are stored into a table (which is accessed by the predictive filter). The best results of the predictive filter are obtained by setting the weights w according to the auto-correlation function of the samples; however, this would require the theoretical knowledge of an infinite sequence of samples. Therefore, in a preferred embodiment of the invention the predictive filter is implemented with an adaptive structure; in this case, the weights w are calculated dynamically in an iterative manner by an optimizer (from an initial set of values).

For this purpose, an error e between the true performance indicator I and its corresponding estimated value $\hat{I}$ (i.e., $e = I - \hat{I}$) is used as a feedback to correct the weights w. Preferably, the optimizer exploits the steepest descent algorithm to determine the values of the weights w that minimize the mean square error. For example, starting from each weight of the current cycle n, denoted with $w^{(n)}$, it would be possible to calculate the corresponding weight $w^{(n+p)}$ p cycles ahead by applying the following formula:

$$w^{(n+p)} = w^{(n)} - \mu \cdot \hat{\nabla}(n+p)$$

wherein μ is a parameter defining the speed of convergence of the algorithm, and $\hat{\nabla}(n+p)$ is the gradient of the mean square error $e(n+p)$ relating to the expected performance indicator $\hat{I}(n+p)$ that is estimated at the current cycle n. By solving the above-mentioned equation, we have:

$$w^{(n+p)} = w^{(n)} + 2\mu \cdot e(n+p) \cdot I(n)$$

However, this formula would require the availability of the error $e(n+p)$ at the time of computation (current cycle n). Therefore, in a preferred embodiment of the invention, the weight $w^{(n+p)}$ is calculated by applying the following approximated formula:

$$w^{(n+p)} = w^{(n)} + \frac{\mu e(n) I(n-p)}{\|I(n-p)\|^2}$$

The expected performance indicators $\hat{I}$ are then supplied to a threshold filter, which determines corresponding problem flags Fp and severity indicators Is. Each problem flag Fp consists of a logic value (false or true) that indicates the occurrence of a corresponding critical condition in the system (when asserted). Particularly, the filter sets the problem flag Fp to false when the corresponding expected performance indicator $\hat{I}$ is lower than a predefined threshold value (for example, 0.7); otherwise, the filter sets the problem flag Fp to true. On the other hand, each severity indicator Is is set to the corresponding expected performance indicator Î (when the problem flag Fp is asserted); in this way, the indicator Is defines a severity of the detected critical condition.

Going back to FIG. 2a, problem flags Fp and severity indicators Is are then provided by filter 251 to an action manager 254. Particularly, those values are received by an interpreter (not shown), which also accesses the resource models. In response to the detection of any critical condition in the system (problem flag Fp asserted), the interpreter determines a corresponding corrective action (predefined in the relevant resource model), in an attempt to recover the correct operation of the system. At the same time, the problem flags Fp and the severity indicators Is are also received by a modulator 257; for each detected critical condition (problem flag Fp asserted) the modulator 257 determines a parameter Pi indicative of the desired intensity of the corresponding corrective action (for example, ranging from 0 to 1). An executor 260 is responsible of actually invoking the corrective action with the desired intensity. The operation is then logged into a structure 263. It should be noted that the use of the problem flags Fp allows processing the information only when real critical conditions are detected.

Typically, each corrective action is implemented by a method that exposes a formal parameter defining its intensity. The corrective action is configurable according to the desired intensity. For example, when the corrective action involves the deletion of jobs in a queue, it is possible to delete a percentage of the jobs corresponding to the intensity parameter Pi (from none for Pi=0 to all for Pi=1). In other cases, the values of the intensity parameter Pi are partitioned into two or more ranges, with a different type of corrective action that is assigned to each range; for example, it is possible to reduce the maximum number of acceptable jobs when the intensity parameter Pi is lower than 0.3, hold on time-consuming jobs when the intensity parameter Pi is between 0.3-0.6, and delete one or more jobs when the intensity parameter Pi is higher than 0.6.

More in detail, the modulator 257 at first sets the intensity parameter Pi to the severity indicator Is of the corresponding critical condition.

The action manager 254 further includes a trimmer (not shown), which is used to select one or more power factors Xp, which are used by the administrator to manipulate the intensity of the corrective actions. For example, a single power factor is used for all the corrective actions, specific power factors are defined for different categories of computers, or a distinct power factor is associated with each corrective action. The modulator 257 updates the intensity parameter Pi of each corrective action by applying a linear transformation based on the corresponding power factor Xp. Particularly, each power factor Xp ranges from 0 to 1. When the power factor has the intermediate value 0.5, no action is performed; conversely, the intensity parameter Pi is reduced when the power factor Xp is lower than 0.5 (for example, the intensity parameter Pi is reset when the power factor Xp is 0) or it is increased otherwise (for example, the intensity parameter Pi is doubled when the power factor Xp is 1). In this way, it is possible to control the execution of the corrective actions manually (for example, increasing the intensities for critical computers or problems to be restored as fast as possible).

The modulator 257 also accesses a repository 269, which stores predefined policies for the application of the corrective actions; as a result, the intensity parameters Pi of the corrective actions to be executed are updated according to the applicable policies. Preferably, the policies are based on temporal criteria. For example, it is possible to decide that the intensity parameter Pi of every corrective action must be limited to 0.5 during the day (i.e., from 8 a.m. to 6 p.m.), that no corrective action must be executed in the same period, and the like.

Before executing a corrective action on the managed resource, the action manager needs to acquire validation and authorization in order to establish that this is a trusted corrective action. The trust principle guarantees that a corrective action can be invoked against a particular managed resource only if it reached at least a trust threshold or it is approved explicitly by the administrator. The trust threshold is dynamically established taking into consideration the effectiveness of previous similar actions. The trust threshold could be set to a predetermined initial value or alternatively interactively obtained by an external authority (e.g. a human operator or system administrator). If the trust level is not reached, then the monitoring authority interacts with the external authority (e.g. the administrator). The external authority will provide or deny the authorisation to perform the proposed action. In this way, both the reliability of the system and its autonomy is protected. In this way the system is self determining whether to perform an action or not basing the decision on the effectiveness of previous similar actions. In case the recent history of the system is not providing a good indication (either because previous actions did not show good results or because there is no history at all) the intervention of an external authority is invoked.

The action manager 254 includes a trust controller 272. For each corrective action that has been executed (as indicated in the log 263) the controller verifies its effectiveness. For this purpose, the controller 272 calculates a corresponding index AE (ranging from 0 to 1), as the normalized variation of the corresponding performance indicator I at the application of the corrective action (time $t_1$) and after a predefined delay (time $t_2$):

$$AE = \frac{1}{2}[I(t_1) - I(t_2) + 1]$$

Preferably, the time $t_2$ is selected taking into account the delay required for the actual execution of the corrective action.

The action effectiveness parameter AE is then passed to a trust monitor 293 which controls that the proposed corrective action has a predetermined minimum trust threshold value TT. If the proposed corrective action does not provide a clear indication of being effective, i.e. the last measured performance indicators does not show an improvement, the corrective action is not authorised and the intervention of an external authority 295 is invoked. The authority can be for example a system administrator who shall decide whether to authorise the action. This intervention is necessary to assure the minimum level of reliability of the system, but it is limited to those cases where the system cannot determine the reliability of the proposed action only looking at the logged data. E.g. the first time a corrective action is proposed, the intervention of the external authority is normally required, but the system administrator might decide to skip this step by setting the action effectiveness parameter AE to an initial value, higher than the predetermined trust threshold TT.

In a preferred embodiment the evaluation of the trust level of the proposed corrective action is performed using a more sophisticated parameter, the Monitoring Trust Level (MTL) which takes into consideration the Action Effectiveness (AE) and the kind of action with its intensity (ACT).

The Monitoring Authority strategy is founded on continuously evaluating the MTL calculated as a statistical average of the AE over an extended period of time and weighted upon the weights coming directly from the human administrator decisions. Initially, for a specific indication type the MTL is zero, so there is no trust by default. All the indication-related info and its sample measures (AE and ACT) are stored inside two tables named INDICATION and QUALITY_SAMPLE. The attribute TRUST in the table QUALITY_SAMPLE represents the trust weight corresponding to the administrator decision. It is an enumerated value. The mechanism for requesting a formal approval to the administrator could be implemented through a messaging/notification capable of prompting interactively if the proposed action with the relative intensity should be undertaken. Also info related to the quality are notified to the administrator to support his decision.

At the end of the trust evaluation process, if the action as been "trusted", the action manager uses the intensity parameter to launch the corrective action, otherwise no action is taken.

The following is a possible implementation example using a pseudo-code:

```
// Insert the indication historical info inside the QUALITY_SAMPLE table
INSERT ROW QUALITY_SAMPLE (Indication, AE, ACT, FALSE);
// MTL_THRESHOLD is a system parameter to evaluate the MTL
if (MTL > MTL_THRESHOLD)
{
    // Assign TRUST automatically to Monitoring Engine
    SendResponse (Engine, TRUE);
    // Update the TRUST (enum value) field with TRUST_AUTO=0.5
    UPDATE ROW QUALITY_SAMPLE (Indication, AE, ACT, TRUST_AUTO);
}
else
{
    // Send a notification to the Authority Administrator
    // to take a decision whether to agree or not
    response=RequestApproval (Administrator, I, AE, ACT);
    // Send the Administrator response to the Monitoring Engine
    SendResponse (Engine, response);
    // Update the TRUST (bool) field with the response obtained by the Administrator
    if (response == TRUE)
        UPDATE ROW QUALITY_SAMPLE (Indication, AE, ACT, TRUST_INTERACTIVE);
    else
        UPDATE ROW QUALITY_SAMPLE (Indication, AE, ACT, TRUST_DENIED);
}
// Perform the average of the last NUM_SAMPLES historical samples weighted on
// the corresponding TRUST enumerated values (INTERACTIVE=2, AUTO=1, DENIED=0)
// Filters the samples to give greater relevance to the ones assigned manually by the Administrator.
MTL=WeightedAverage (QUALITY_SAMPLE::AE, QUALITY_SAMPLE::TRUST, NUM_SAMPLES);
// Update the MTL with the new value
UPDATE ROW INDICATION (Indication, MTL);
```

The above described Action Effectiveness parameter AE has also an additional use. The modulator 257 increases the intensity parameter Pi when the effectiveness index AE falls below a threshold value; for example, the intensity parameter Pi is increased of 10% when the effectiveness index AE is between 0.3-0.5 and of 20% when the effectiveness index AE is lower than 0.3. In this way, it is possible to implement a feedback loop, which increases the intensity of the corrective actions when they are ineffective in solving the problems.

Similar considerations apply if the programs and the corresponding data are structured in another manner, or if different modules or functions are provided.

Figure 3A:
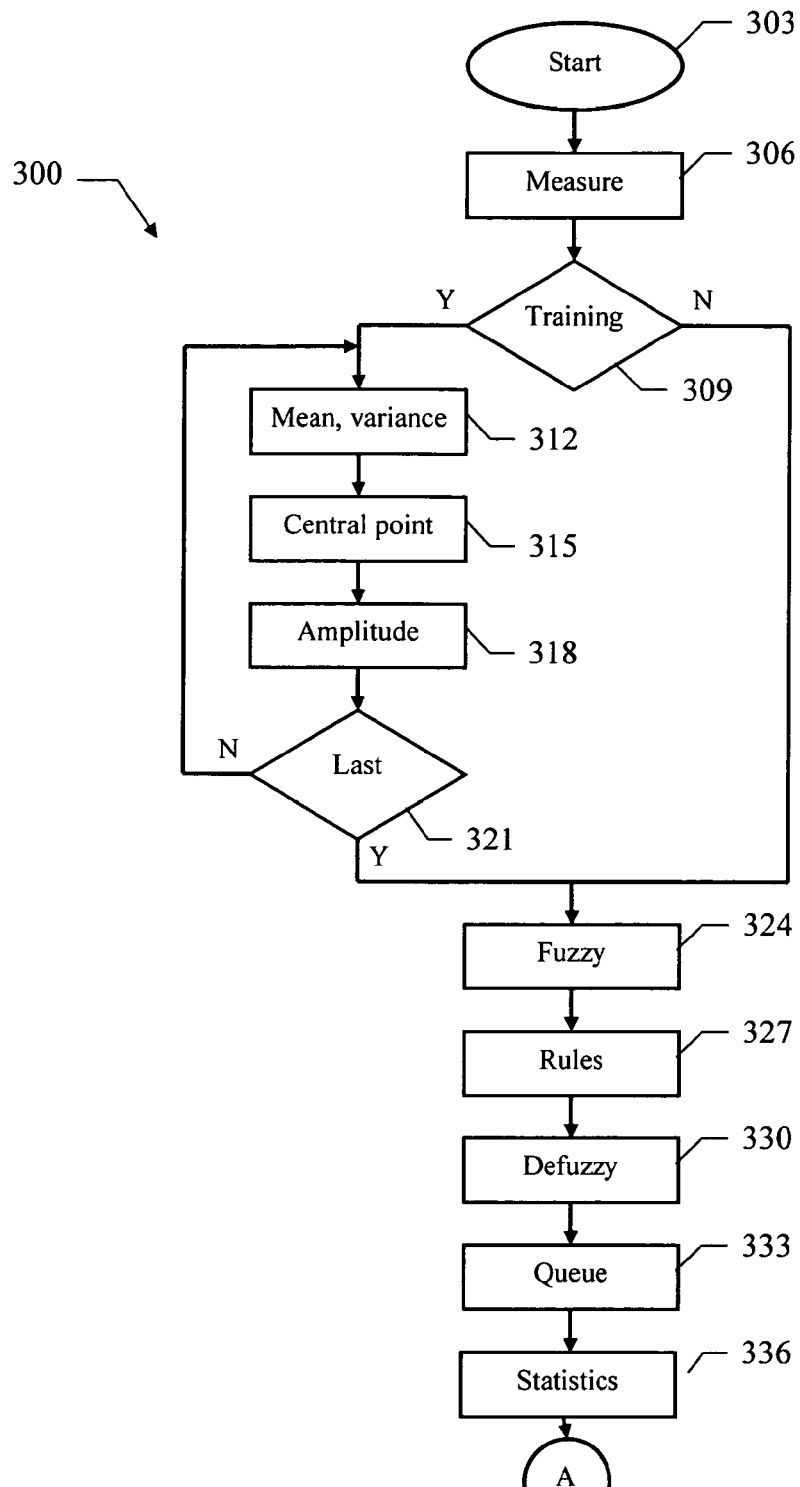
FIGS. 3a-3b show a flow chart describing the logic of an illustrative implementation of the method.
Figure 3B:
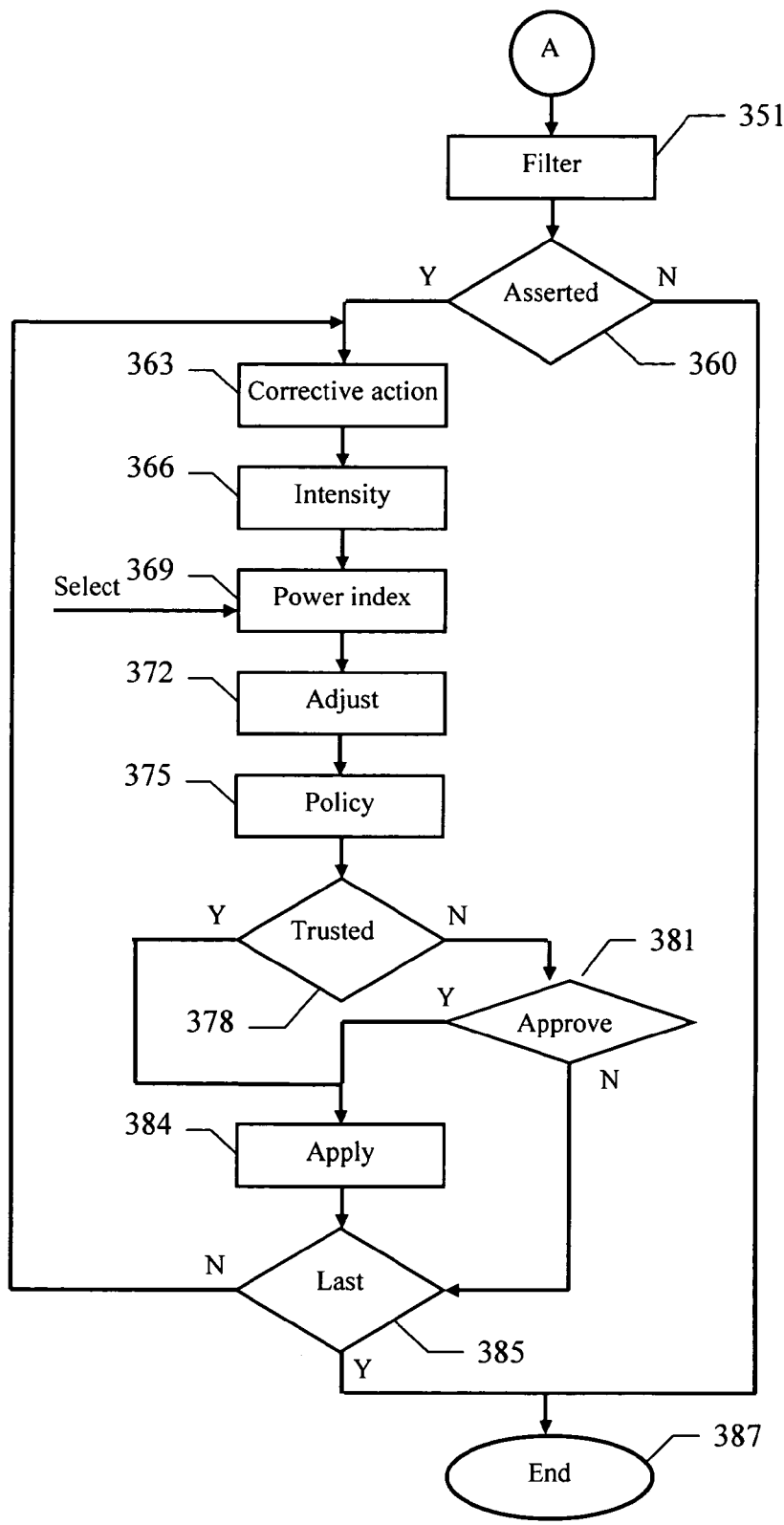

Considering now FIGS. 3*a*-3*b*, the logic flow of a monitoring process according to an embodiment of the invention is represented with a method 300; the method is executed continually at scheduled intervals (for example, every hour). The method begins at the start block 303, and then passes to block 306 wherein the desired state parameters are measured.

The method verifies at block 309 whether a training process for defining the distributions of the fuzzy variables must be run. If so, the blocks 312-321 are executed, and the method then passes to block 324; conversely, the flow of activity descends into block 324 directly. Typically, the training process is always active during a startup phase of the system for a suitable period until the distributions of the fuzzy variables reach a steady condition (starting from a default configuration wherein the distributions are defined by triangles having identical amplitudes and uniformly spaced throughout the corresponding universe of discourse); then, the training process is run periodically (for example, every night) to account for intervening modifications of the environment. In this way, the training process is active only for short periods; therefore, this process (being quite resource consuming) does not adversely affect the performance of the monitored computer.

Considering now block 312 (training process), the mean value m and the normalized variance σ of the logged values of each state parameter and performance indicator (generically denoted as crisp variables) are calculated.

For each fuzzy variable, the central points $x_j$ of the triangles defining the distributions of the corresponding properties (with j=0 . . . 2 in the example at issue) are defined at block 315. Particularly, the central point $x_0$ of the first property (low) and the central point $x_2$ of the last property (high) is set to the minimum value and to the maximum value, respectively, of the corresponding crisp variable; the central point $x_1$ of the remaining property (normal) is instead set to the mean value m of the crisp variable. The algorithm can be readily extended to situations wherein the number of properties is higher; in this case, the central point $x_j$ of any other property is calculated by the formula:

$$x_j = \frac{(x_{j+1} - x_{j-1})}{2 \cdot \sigma}$$

Continuing to block 318, the amplitude $A_j$ of the triangles defining the distributions of the corresponding properties are then defined as:

$$A_j = \frac{(x_j - x_{j-1})}{2 \cdot (\sigma + 1)}$$

A test is now made at block 321 to determine whether all the crisp variables (state parameters and performance indicators) have been processed. If not, the method returns to block 312 to repeat the same operations for a next fuzzy variable. Conversely, the flow of activity descends into block 324.

Considering now block 324, the state parameters are converted into the corresponding input fuzzy variables. The method proceeds to block 327, wherein the output fuzzy variables (associated with the performance indicators) are evaluated by applying the inference rules. The output fuzzy variables so obtained are then defuzzed at block 330, in order to provide the corresponding performance indicators. Proceeding to block 333, each performance indicator so obtained is inserted into the corresponding queue (removing the oldest value). At the same time, both the state parameters and the performance indicators are logged into the statistic repository at block 336.

A check is performed at block 351 to determine whether at least one performance indicator exceed the threshold value; in such case a problem flag Fp is asserted. As mentioned above a predictor could be added to this process to increase the efficiency of the system.

Considering now block 360, if one or more problem flags Fp are asserted (to denote the occurrence of the corresponding critical conditions), the blocks 363-385 are executed and the method then ends at the final block 387; conversely, the flow of activity descends into the final block 387 directly.

For each detected critical condition, starting from the first one (blocks 363-385), the corrective action corresponding to the critical condition is determined at block 363 (as defined in the resource models). Proceeding to block 366, the intensity parameter Pi for the corrective action is set to the severity indicator Is of the corresponding critical condition. The power factor Xp for the corrective action is retrieved at block 369 (typically, this power factor Xp has been asynchronously selected by the administrator). The method then passes to block 372, wherein the intensity parameter Pi is adjusted accordingly. The intensity parameter Pi is further updated at block 375 by applying the relevant policies. A test is now made at block 378 to verify the reliability of the corrective action basing this evaluation on previously tracked actions (if any). As detailed above the trust evaluation can be based on the AE parameter using the above described function, or a more complicated algorithm, e.g. the MTL parameter described above. In case not enough information on the action effectiveness is available or if the parameter does not reach a predetermined minimum threshold, the intervention of an external authority (e.g. a system administrator) is requested (step 381). If the test at step 378 indicates that the proposed corrective action has reached the trust threshold, or if the trust authority gave its approval, then the control goes to step 384 and the corrective action is applied, with the desired intensity; otherwise no action is performed and the method descends directly into block 385.

A test is then made at block 385 to determine whether all the critical conditions have been processed. If not, the method returns to block 363 to repeat the same operations for a next critical condition. Conversely, the flow of activity descends to the final block 387.

Similar considerations apply if the method includes equivalent or additional steps. In any case, the solution of the invention is also suitable to be carried out with the training process that is executed with another policy (for example, whenever a significant change in the corresponding statistics occurs); likewise, the central points and/or the amplitudes of the distributions can be calculated with different formulas.

Although the invention has been described above with a certain degree of particularity with reference to preferred embodiment(s) thereof, it should be understood that various changes in the form and details as well as other embodiments are possible. Particularly, it is expressly intended that all combinations of elements and/or method steps that substantially perform the same function in the same way to achieve the same results are within the scope of the invention.

For example, the method can be applied in any other data processing system, or can be based on different indicators of its performance (for example, relating to single resources or transactions performed on the system). Moreover, the critical conditions can be detected in another way (for example, using the severity indicator Is only, without any problem flags). In any case, it is possible to determine the intensity parameters Pi to be associated with the corrective actions with more sophisticated techniques (for example, based on statistics of the severity indicators Is). Also the indication of the Action Effectiveness and corresponding trust level of the system could be based on different parameters or algorithms.

Moreover, the solution of the invention is also suitable to be implemented with fuzzy variables having different and/or additional properties (for example, very high and extremely high); likewise, in more sophisticated implementations the distributions have other shapes, or the operators applied to the input fuzzy variables are resolved in a different way. Alternatively, the performance parameters are converted into the input fuzzy variables and/or the output fuzzy variables are converted into the critical indexes in a different way (for example, calculating the center of gravity exactly with integrals or applying other techniques, such as the mean of maximum method). Likewise, the inference rules can be applied with other techniques (for example, by combining the distributions of the input fuzzy variables to obtain the corresponding distributions of the output fuzzy variables).

In any case, it is possible to estimate the expected performance indicators with different algorithms (for example, based on any number of samples or for a different number of cycles ahead, down to a single one).

Moreover, any other kind of policy is supported, for example, implementing more sophisticated temporal criteria (such as conditions based on multiple time ranges, on working/holiday days, and the like).

In any case, the power factors can be applied with other algorithms (for example, only supporting discrete values each one involving a specific adjustment of the intensity parameters).

Different feedback schema can also be implemented (for example, based on running averages of the performance indicators).

In addition, the programs can be distributed on any other computer readable medium (such as a DVD).

Moreover, it will be apparent to those skilled in the art that the additional features providing further advantages are not essential for carrying out the invention, and may be omitted or replaced with different features.

For example, in alternative embodiments of the invention the severity indicators are calculated using other techniques (for example, based on neural networks).

Moreover, the application of the proposed solution to the current values of the performance indicators (without performing any estimation of their predicted values) is contemplated.

Alternatively, it is possible to have an implementation that does not support the definition of any policy.

Conversely, the policies can be based on other criteria that are not based on temporal conditions (for example, updating the intensity parameters according to a category of the computer on which the corrective action must be applied).

In addition, a different embodiment of the invention does not allow the selection of any power factor.

Likewise, an implementation of the invention without any feedback on the effectiveness of the application of the corrective actions is not excluded.

In any case, the programs can be sent to the system through the network, can be broadcast, or more generally can be provided in any other form directly loadable into the working memory of the system.

However, the method according to the present invention leads itself to be carried out with a hardware structure (for example, integrated in a chip of semiconductor material), or with a combination of software and hardware.

Finally, in a very simple embodiment the invention could be carried out without any predicting mechanism, without any action intensity modulation, and even without using the fuzzy logic described above.

Naturally, in order to satisfy local and specific requirements, a person skilled in the art may apply to the solution described above many modifications and alterations all of which, however, are included within the scope of protection of the invention as defined by the following claims.

The invention claimed is:

1. A computer program product comprising a computer recordable medium having a computer readable program recorded thereon, wherein the computer readable program, when executed on a computing device, causes the computing device to:
provide at least one performance indicator of the system;
detect a critical condition of the system according to the at least one performance indicator;
select a corrective action for the critical condition, the corrective action having a corresponding action effectiveness parameter;
authorize the execution of the corrective action if the corresponding action effectiveness parameter satisfies predetermined threshold criteria;
verify the effectiveness of the execution of the corrective action on the critical condition; and
update the corresponding action effectiveness parameter according to the effectiveness of the corrective action, wherein the critical condition is defined by a severity indicator, and wherein the computer readable program to verify the effectiveness of the execution of the corrective action on the critical condition further includes computer readable program that causes the computing device to:
for each at least one performance indicator, log a plurality of detected severity indicators; and
estimate the action effectiveness with a function depending on a set of the plurality of detected severity indicators, wherein the computer readable program to estimate the action effectiveness with a function depending on a set of the plurality of detected severity indicators further includes computer readable program that causes the computing device to use the function:

$$AE = \tfrac{1}{2}[I(t_1) - I(t_2) + 1]$$

where AE is the action effectiveness and $I(t_n)$ is the severity indicator at time n.

2. The computer program product of claim 1, wherein the computer readable program to estimate the action effectiveness with a function depending on a set of the plurality of detected severity indicators further includes computer readable program that causes the computing device to:
increase the value of the action effectiveness parameter in response to a decreasing trend of the set of detected severity indicators.

3. The computer program product of claim 1, wherein upon failure of the computer readable program to authorize the execution of the corrective action if the corresponding action effectiveness parameter satisfies predetermined threshold criteria the computer readable program further causes the computing device to interrogate an external trust authority for granting such authorization.

4. The computer program product of claim 1, wherein the computer readable program to provide the at least one performance indicator further includes computer readable program that causes the computing device to:
store a set of samples for each performance indicator; and
estimate an expected value of each performance indicator through a predictive algorithm based on the corresponding set of samples.

5. The computer program product of claim 1, wherein the computer readable program further includes computer readable program that causes the computing device to:
associate an intensity parameter with the corrective action according to the severity indicator of the corresponding critical condition; and
apply the corrective action according to the intensity parameter.

6. A data processing system comprising:
a processor; and
a memory coupled to the processor, wherein the memory comprises instructions which, when executed by the processor, cause the processor to:
provide at least one performance indicator of the system;
detect a critical condition of the system according to the at least one performance indicator;
select a corrective action for the critical condition, the corrective action having a corresponding action effectiveness parameter;
authorize the execution of the corrective action if the corresponding action effectiveness parameter satisfies predetermined threshold criteria;
verify the effectiveness of the execution of the corrective action on the critical condition; and
update the corresponding action effectiveness parameter according to the effectiveness of the corrective action, wherein the critical condition is defined by a severity indicator, and wherein the instructions to verify the effectiveness of the execution of the corrective action on the critical condition further cause the processor to:
for each at least one performance indicator, log a plurality of detected severity indicators; and estimate the action effectiveness with a function depending on a set of the plurality of detected severity indicators, wherein the instructions to estimate the action effectiveness with a function depending on a set of the plurality of detected severity indicators further cause the processor to use the function:

$$AE = \tfrac{1}{2}[I(t_1) - I(t_2) + 1]$$

where AE is the action effectiveness and $I(t_n)$ is the severity indicator at time n.

7. The data processing system of claim 6, wherein the instructions to estimate the action effectiveness with a function depending on a set of the plurality of detected severity indicators further cause the processor to:
   increase the value of the action effectiveness parameter in response to a decreasing trend of the set of detected severity indicators.

8. The data processing system of claim 6, wherein upon failure of the instructions to authorize the execution of the corrective action if the corresponding action effectiveness parameter satisfies predetermined threshold criteria the instructions further causes the processor to interrogate an external trust authority for granting such authorization.

9. The data processing system of claim 6, wherein the instructions to provide the at least one performance indicator further cause the processor to:
   store a set of samples for each performance indicator; and
   estimate an expected value of each performance indicator through a predictive algorithm based on the corresponding set of samples.

10. The data processing system of claim 6, wherein the instructions further cause the processor to:
   associate an intensity parameter with the corrective action according to the severity indicator of the corresponding critical condition; and
   apply the corrective action according to the intensity parameter.

11. A computer program product comprising a computer recordable medium having a computer readable program recorded thereon, wherein the computer readable program, when executed on a computing device, causes the computing device to:
   provide at least one performance indicator of the system;
   detect a critical condition of the system according to the at least one performance indicator;
   select a corrective action for the critical condition, the corrective action having a corresponding action effectiveness parameter;
   authorize the execution of the corrective action if the corresponding action effectiveness parameter satisfies predetermined threshold criteria;
   verify the effectiveness of the execution of the corrective action on the critical condition; and
   update the corresponding action effectiveness parameter according to the effectiveness of the corrective action, wherein the computer readable program to provide the at least one performance indicator further causes the computing device to:
   measure at least one state parameter of the system;
   convert each state parameter into a corresponding input fuzzy variable;
   apply at least one fuzzy-logic rule defining at least one output fuzzy variable as a function of the at least one input fuzzy variable, each output fuzzy variable being associated with a corresponding performance indicator; and
   convert each output fuzzy variable into the corresponding performance indicator.

12. The computer program product of claim 11, wherein the critical condition is defined by a severity indicator and wherein the computer readable program to verify the effectiveness of the execution of the corrective action on the critical condition further includes computer readable program that causes the computing device to:
   for each at least one performance indicator, log a plurality of detected severity indicators; and
   estimate the action effectiveness with a function depending on a set of the plurality of detected severity indicators.

13. The computer program product of claim 12, wherein the computer readable program to estimate the action effectiveness with a function depending on a set of the plurality of detected severity indicators further includes computer readable program that causes the computing device to:
   increase the value of the action effectiveness parameter in response to a decreasing trend of the set of detected severity indicators.

14. The computer program product of claim 12, wherein the computer readable program further includes computer readable program that causes the computing device to:
   associate an intensity parameter with the corrective action according to the severity indicator of the corresponding critical condition; and
   apply the corrective action according to the intensity parameter.

15. The computer program product of claim 11, wherein upon failure of the computer readable program to authorize the execution of the corrective action if the corresponding action effectiveness parameter satisfies predetermined threshold criteria the computer readable program further causes the computing device to interrogate an external trust authority for granting such authorization.

16. The computer program product of claim 11, wherein the computer readable program to provide the at least one performance indicator further includes computer readable program that causes the computing device to:
   store a set of samples for each performance indicator; and
   estimate an expected value of each performance indicator through a predictive algorithm based on the corresponding set of samples.

17. A data processing system comprising:
   a processor; and
   a memory coupled to the processor, wherein the memory comprises instructions which, when executed by the processor, cause the processor to:
   provide at least one performance indicator of the system;
   detect a critical condition of the system according to the at least one performance indicator;
   select a corrective action for the critical condition, the corrective action having a corresponding action effectiveness parameter;
   authorize the execution of the corrective action if the corresponding action effectiveness parameter satisfies predetermined threshold criteria;
   verify the effectiveness of the execution of the corrective action on the critical condition; and
   update the corresponding action effectiveness parameter according to the effectiveness of the corrective action, wherein the instructions to provide the at least one performance indicator further causes the processor to:
   measure at least one state parameter of the system;
   convert each state parameter into a corresponding input fuzzy variable;

apply at least one fuzzy-logic rule defining at least one output fuzzy variable as a function of the at least one input fuzzy variable, each output fuzzy variable being associated with a corresponding performance indicator; and convert each output fuzzy variable into the corresponding performance indicator.

18. The data processing system of claim 17, wherein the critical condition is defined by a severity indicator and wherein the instructions to verify the effectiveness of the execution of the corrective action on the critical condition further cause the processor to:

for each at least one performance indicator, log a plurality of detected severity indicators; and estimate the action effectiveness with a function depending on a set of the plurality of detected severity indicators.

19. The data processing system of claim 18, wherein the instructions to estimate the action effectiveness with a function depending on a set of the plurality of detected severity indicators further cause the processor to:

increase the value of the action effectiveness parameter in response to a decreasing trend of the set of detected severity indicators.

20. The data processing system of claim 18, wherein the instructions further cause the processor to:

associate an intensity parameter with the corrective action according to the severity indicator of the corresponding critical condition; and apply the corrective action according to the intensity parameter.

21. The data processing system of claim 17, wherein upon failure of the instructions to authorize the execution of the corrective action if the corresponding action effectiveness parameter satisfies predetermined threshold criteria the instructions further causes the processor to interrogate an external trust authority for granting such authorization.

22. The data processing system of claim 17, wherein the instructions to provide the at least one performance indicator further cause the processor to:

store a set of samples for each performance indicator; and estimate an expected value of each performance indicator through a predictive algorithm based on the corresponding set of samples.

* * * * *